United States Patent [19]
Bhanot et al.

[11] Patent Number: 5,796,934
[45] Date of Patent: Aug. 18, 1998

[54] FAULT TOLERANT CLIENT SERVER SYSTEM

[75] Inventors: Pradeep Bhanot, Redwood Shores, Calif.; Paul Jackson, Philadelphia, Pa.

[73] Assignee: Oracle Corporation, Redwood Shores, Calif.

[21] Appl. No.: 656,665

[22] Filed: May 31, 1996

[51] Int. Cl.$^6$ ........................................ G06F 11/00
[52] U.S. Cl. ........................ 395/182.02; 395/182.13; 395/182.17; 395/182.18
[58] Field of Search ................ 395/182.02, 182.03, 395/182.04, 182.05, 182.13, 182.16, 182.17, 182.18, 200.69, 200.73

[56] References Cited

U.S. PATENT DOCUMENTS

| | | | |
|---|---|---|---|
| 5,157,663 | 10/1992 | Major et al. | 371/9.1 |
| 5,473,771 | 12/1995 | Burd et al. | 395/182.02 |
| 5,566,297 | 10/1996 | Devarakonda et al. | 395/182.13 |
| 5,594,863 | 1/1997 | Stiles | 395/182.13 |
| 5,633,999 | 5/1997 | Clowes et al. | 395/182.04 |

*Primary Examiner*—William M. Treat
*Attorney, Agent, or Firm*—Wagner, Murabito & Hao

[57] ABSTRACT

A method for providing fault tolerance in a client/server computer system. A client is initially connected to a primary server. The primary server normally handles all of the client's transactions. However, a secondary connection is designated to a backup server, whereby if the primary server ever becomes disabled, the client is automatically switched over to the backup server. In-flight transaction information corresponding to transactions currently being processed by the primary server is stored and regularly updated by the client. The client regularly polls the primary server to check whether the primary server is properly functioning. If the primary server becomes disabled, all in-flight transactions pending on the disabled server are rolled back and the client resubmits in-flight transaction information to the backup server so that it can complete any transactions which were in progress on the primary server at the time of the failure. Thus, server failures are transparent to the user.

15 Claims, 6 Drawing Sheets

FAULT TOLERANT CLIENT SERVER SYSTEM

FIELD OF THE INVENTION

The present invention pertains to the field of fault tolerant client/server computer systems.

BACKGROUND OF THE INVENTION

Computers have become an integral tool used in a wide variety of different applications, such as in finance and commercial transactions, three-dimensional and real-time graphics, computer-aided design and manufacturing, healthcare, telecommunications, education, etc. Computers are finding new applications as their performance and speeds ever increase while costs decrease due to advances in hardware technology and rapid software development. Furthermore, a computer system's functionality and usefulness can be dramatically enhanced by coupling stand-alone computers together to form a computer network. In a computer network, users may readily exchange files, share information stored on a common database, pool resources, communicate via e-mail and even video teleconference.

One popular type of network setup is known as "client/server" computing. Basically, users perform tasks through their own dedicated desktop computer (i.e., the "client"). The desktop computer is networked to a larger, more powerful central computer (i.e., the "server"). The server acts as an intermediary between a group of clients and a database stored in a mass storage device. An assortment of network and database software enables communication between the various clients and the server. Hence, in a client/server arrangement, the data is easily maintained because it is stored in one location; the data can be shared by a number of local or remote systems; the data is easily and quickly accessible; and users may readily be added or removed.

Although client/server systems offer a great deal of flexibility and versatility, people are sometimes reluctant to use them in certain mission critical applications, unless the servers have a high degree of reliability. Otherwise, a single server failure may detrimentally affect a large number of clients which are dependent on that particular server. In some mission critical applications, any computer downtime may have serious implications. For example, if a server were to fail in the middle of processing a financial application, such as in payroll, securities, bank accounts, electronic money transfer, etc., the failure may result in disastrous consequences. Moreover, customer relations might be jeopardized (e.g., lost airline, car rental, or hotel reservations; delayed or mis-shipped orders; lost billing information; etc.). Even short, temporary computer failures are often intolerable. Further exacerbating the problem is the fact that as computers take on more comprehensive and demanding tasks, the hardware and software become more complex and hence, failures are more likely to occur.

In light of the vulnerabilities associated with advanced computer systems, some computer manufacturers have attempted to enhance the reliability of their products by adding layers of redundancy. When one part of the computer system fails, the failure is detected and a backup automatically takes over. In some instances, the same work is performed twice by two separate circuits, in case one of the processes fails. Of course, these specialized "hot standby" systems come at an extremely high price. Furthermore, these systems tended to be proprietary. Once one of these systems is purchased, the buyer is locked in to purchasing and upgrading the system exclusively from that particular vendor. The unattractive alternative is to completely change over the entire computer system or face having incompatible computer systems.

A less expensive prior art alternative for granting client/server systems a degree of resiliency, involves shifting the work from a malfunctioning server to one that is in good operating condition. This is accomplished by establishing a new connection to an operational server when the failure is detected. Work would then continue on the newly connected server. However, this prior art scheme has several disadvantages. Namely, the end user is required to log-on to the new server and then sign back on to the original application from the new server. This switch-over process is time consuming, tedious, and frustrating. Another major disadvantage is the fact that typically, all in-flight transactions being processed when the failure occurred, are inevitably lost. Since the failed server did not complete its pending transactions, those transactions must be rolled back to their original status. As a result, the end-user must start his or her task all over again. For example, an end user might be updating general ledger information when a failure occurs. After re-connecting onto a different server, the end user must then re-enter the general ledger information because the previously entered but uncompleted transaction is now irretrievably lost. This process is very wasteful and inefficient.

Thus, there is a need in the prior art for an efficient, user-friendly, and cost effective fault tolerant client/server system. The present invention offers a unique and novel solution whereby failures are transparent to the end user and in-flight transactions are preserved and completed without apparent interruption. The solution offered by the present invention is also relatively inexpensive and is capable of being retrofitted into many of today's client-server systems.

SUMMARY OF THE INVENTION

The present invention pertains to a method and apparatus for providing fault tolerance in a client/server system. A connection is made to a primary server which normally handles all of that particular client's transactions. At the same time, a secondary connection to a backup server is specified. The backup server regularly polls the primary server to verify that it is operational. Similarly, the client also regularly polls the primary server to determine whether the primary server is operational. If the primary server ever becomes disabled, several actions occur. From the server side, the backup server rolls back all in-flight transactions which were pending on the primary server according to information stored in a cumulative redo log. The backup server then handles all future transactions from that client. From the client side, a connection is automatically established to the backup server. All in-flight transactions, as stored in a transaction log residing within the client, is re-submitted to the backup server. By submitting the in-flight transaction information to the backup server, the backup server can successfully finish any transactions which were in progress on the primary server at the time of the failure. In other words, all in-flight transactions can complete without further intervention from the user. Thus, server failures are transparent to the user.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A fault tolerant client/server system according to the present invention is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention. Furthermore, it should be noted that the present invention may be practiced across a wide range of different clusterable platforms (e.g., Sequent machines, IBM R6000 series, DEC VAX clusters, etc.). The present invention is applicable to different parallel server technologies, such as Very Highly Available Clustered Multi-Processing (VHACMP), Massively Parallel Processing (MPP), Symmetric Multi-Processing (SMP), etc.

Figure 1:
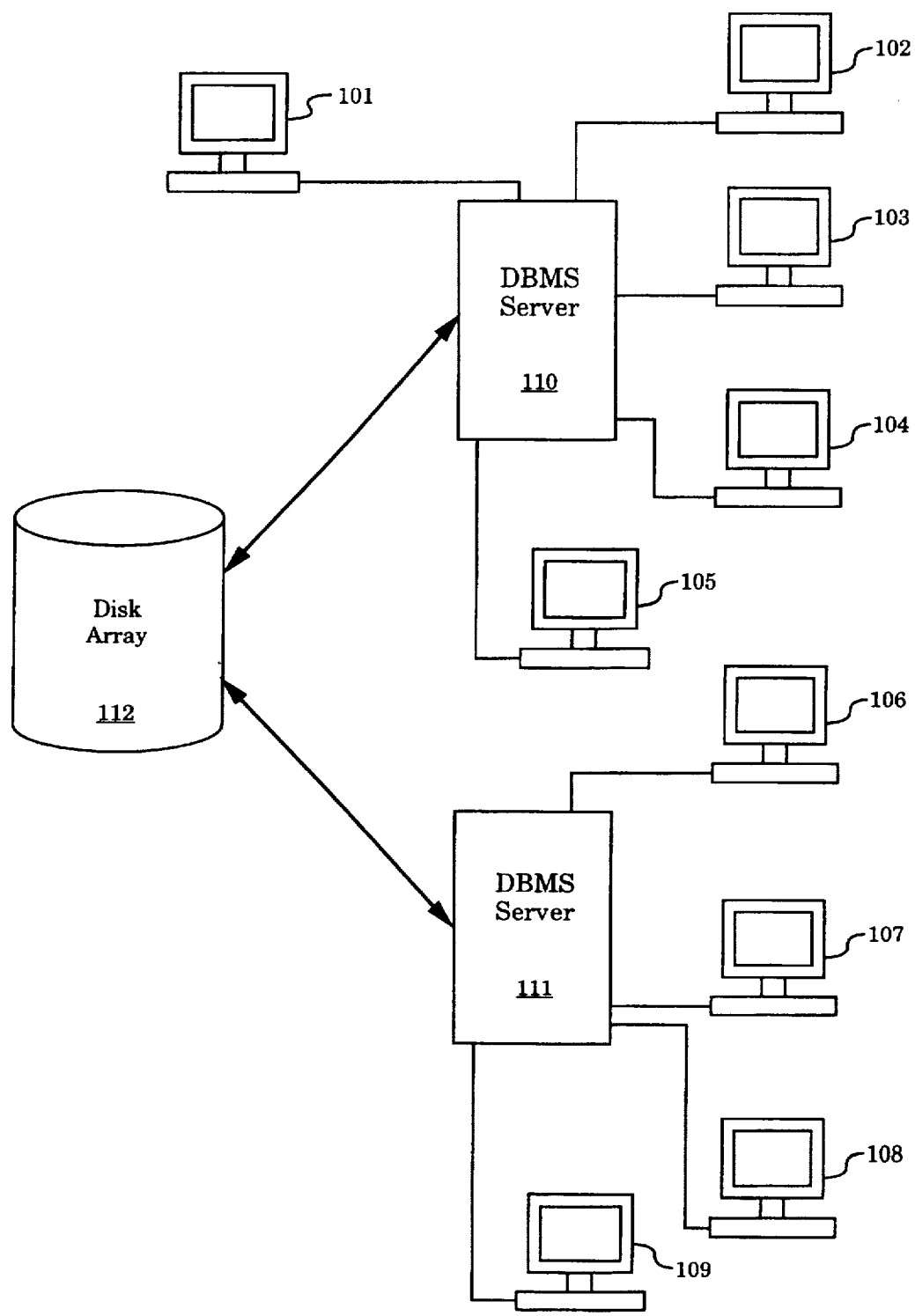
FIG. 1 shows a block diagram of a client/server system upon which the present invention may be practiced.

Referring to FIG. 1, a block diagram of a client/server system upon which the present invention may be practiced is shown. In the currently preferred embodiment, server 110 is part of a parallel server configuration, whereby different servers running different instances of a DBMS, can simultaneously access the same database. Although the present invention is not limited to parallel server configurations, it is especially useful in networks employing parallel server technology. A number of clients (e.g., personal computers, workstations, portable computers, etc.) 101-109 are completed to and serviced by servers 110 and 111. Although the present invention may be readily applied to networks having more than two servers, for the sake of simplicity and ease of understanding, the present discussion focuses on the case where there are only two servers 110 and 111. Servers 110 and 111 are comprised of computers running a shared database management system (DBMS). A DBMS is a piece of software that manages access to a database. Basically, a database is a collection of related files containing information. These files are stored in hardware in a mass storage device, such as in a disk drive array 112. One or more databases may be stored in disk drive array 112. A DBMS "mounts" a particular database in order to access tables of information contained within the files associated with that database. Thereby, data stored in the form of tables in a relational database residing in the disk drive array 112 are accessible to any of the clients 101-109 via servers 110 or 111. Programs running on the servers, known as "processes, workers, threads, etc.," are used to interact with the clients 101-109 and to manipulate the relational database data in the disk drive array 112. For purposes of consistency, the term "process" is used extensively in this detailed description to refer to programs or sets of code running on a server. One particular kind of process, referred to as a server process, receives requests generated by client applications. This server process interacts with other processes and with the client applications to service the client applications' requests.

Figure 2:
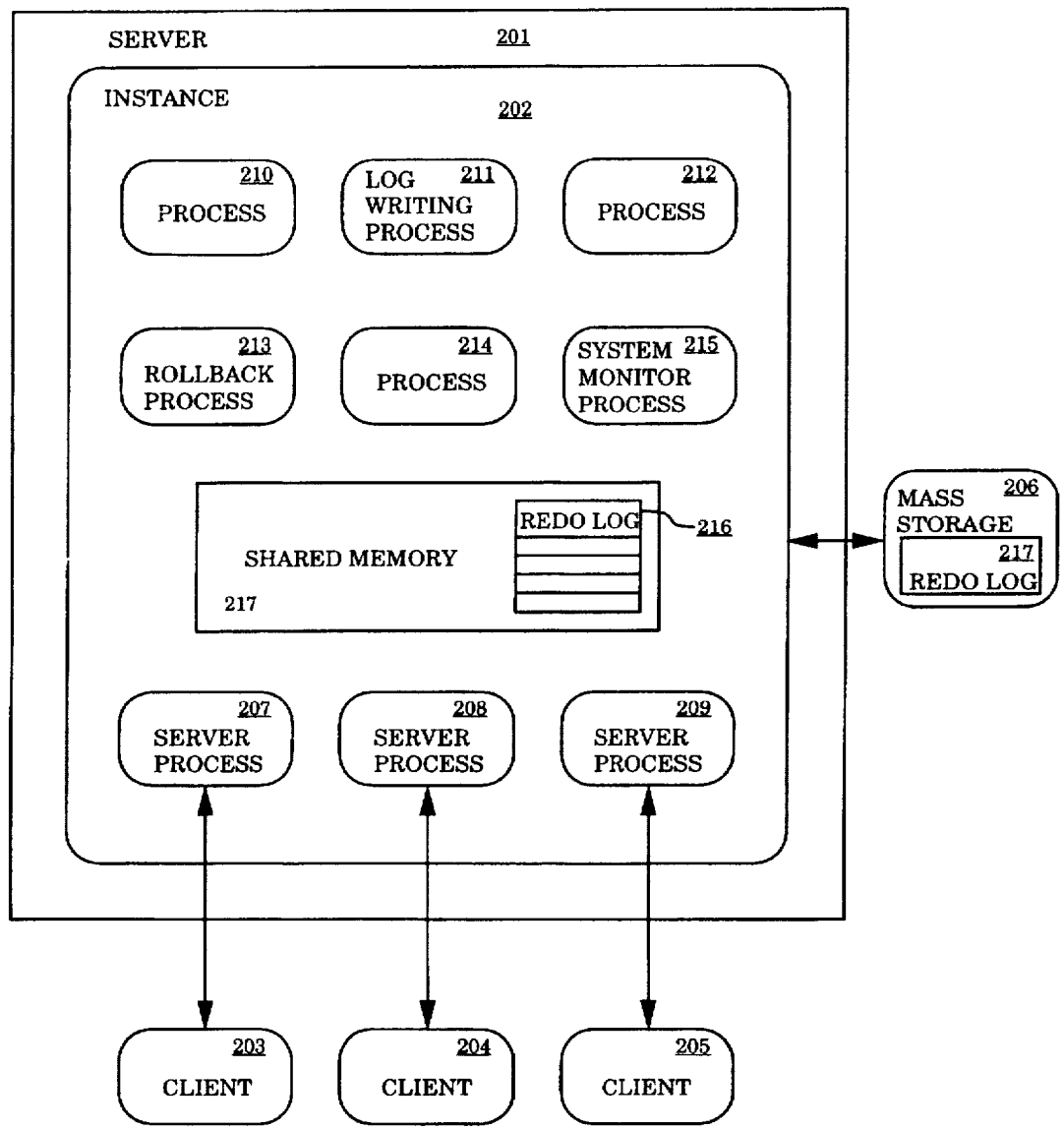
FIG. 2 shows the relationship between an instance running on a server, clients coupled to the server and a database residing in a mass storage device.

FIG. 2 shows how an instance 202 of the DBMS running on server 201 acts as an interface between clients 203-205 and a database residing within mass storage 206. An instance 202 is a particular execution of the DBMS on server 201. Applications, such as payroll, inventory, human resources, etc., running on clients 203-205 interact with a corresponding server process 207-209. When a user logs on to a client, a connection is established between that client and server 201; one or more server processes are then spawned. These server processes, together with other dedicated processes 210-215, perform the requested tasks (e.g., fetch data, store data, edit data, etc.) with respect to the database. The server processes include a rollback process 213, a log writing process 211, and a system monitor process 215. The rollback process 213 performs a rollback function whenever an in-progress transaction is deliberately halted by the user or when a transaction is prematurely halted due to server failure. In the first instance, a user controls whether a proposed transaction is allowed to be actually carried out. If the user wishes to cancel the proposed transaction, the rollback process renders that particular transaction ineffectual so that it has no effect whatsoever on the contents of the database.

In other words, the rollback process cancels the proposed transaction so that, as far as the system is concerned, it is as if the transaction had never been entered. Otherwise, if the user is satisfied with the proposed transaction, the transaction is committed by making the proposed changes to the database. As a specific example, the payroll department might be instructed to change an employee's salary. The database administrator discovers that he or she had accidentally entered the wrong salary. The administrator may initiate a rollback process to prevent the erroneous salary figure to be entered into the database. After the correct salary is entered, the administrator may commit the transaction which causes the employee's old salary to be changed to the new salary in the database.

In the second instance, where a server becomes disabled, all in-flight transactions corresponding to the disabled server are rolled back. In other words, all effects of uncompleted transactions are wiped out. It is as if the uncompleted transactions had never even been entered.

Rollback is made possible by the log writing process 211, which writes information regarding in-flight transactions into a redo log 216. A copy of every transaction is stored in memory into redo log 216. Eventually, the final copy of the data is recorded back to the mass storage device 206. Each server contains its own copy of a redo log 216 for recording transactions associated with its clients. When a client issues a transaction, that transaction is recorded in the redo log of its corresponding server. A transaction is removed from the redo log after it completes or after it is rolled back. A separate cumulative redo log 217 resides within the mass storage device. The cumulative redo log stores all in-flight transactions pending on each of the servers. Thereby, if a server fails, the in-flight transactions associated with the failed server are rolled back based upon the information contained within the mass storage device's cumulative redo log 217. System monitor process 215 is used to perform any recovery that is needed at startup. It is also used to check the functionality of other services hooked up to the network and performs recovery in case of failures.

Figure 3:
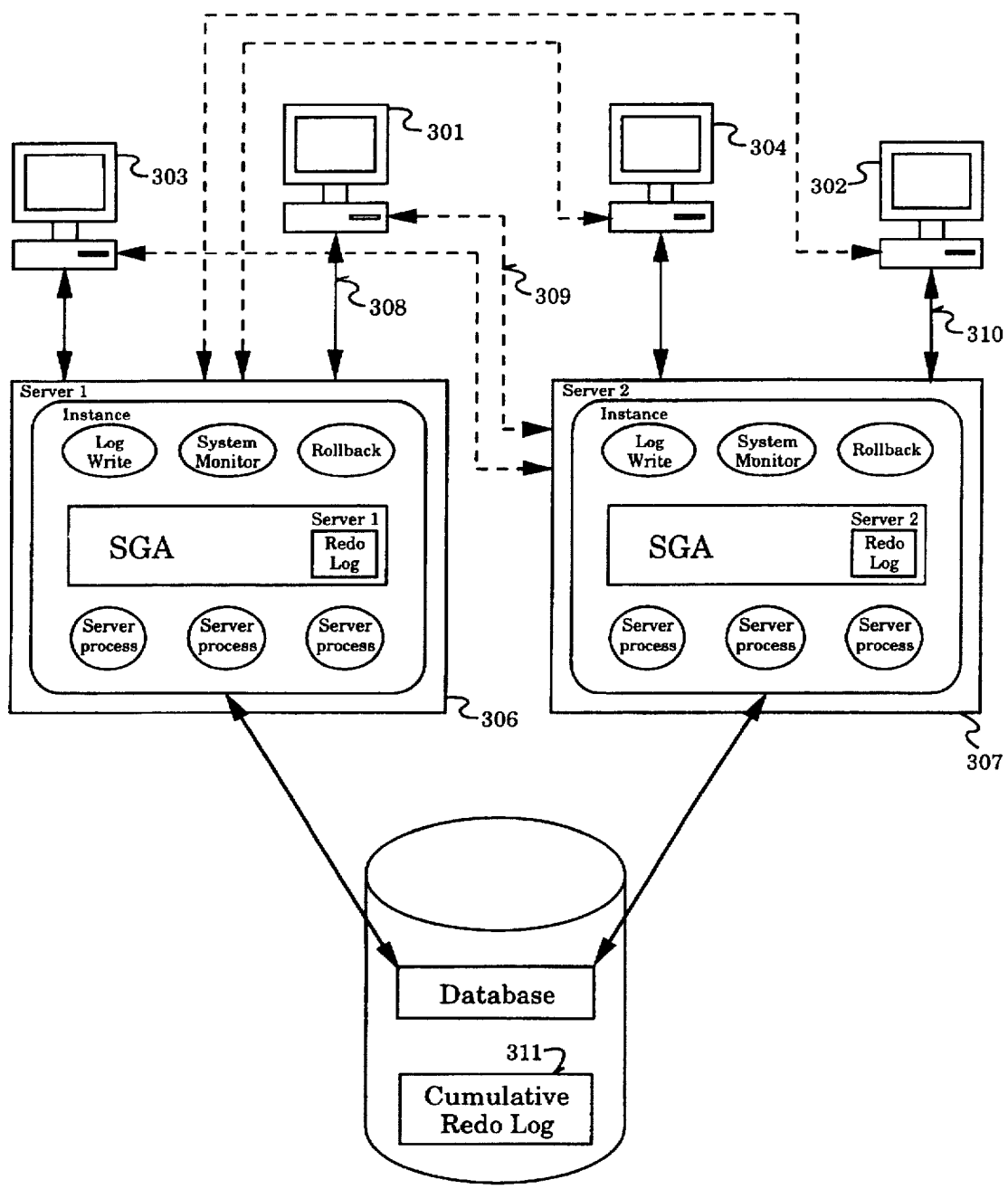
FIG. 3 shows a fault-tolerant client-server network.

The present invention enhances the network's availability and degree of fault tolerance as follows. FIG. 3 shows an example of a computer network having multiple clients 301–304. Initially, connections are established between each of the clients 301–304 and one of the servers 306 or 307. For example, client 301 is connected to server 306. Hence, server 306 is the primary server for client 301. All transactions from client 301 are normally handled by server 306.

Likewise, server 307 is the primary server for client 304. Furthermore, a secondary or backup connection is designated, but not established for each of the clients 301–304. For example, connection 308 is the primary connection for client 301. All transactions normally occur through connection 308. Client 301 regularly polls its primary server 306. If primary server 306 fails to acknowledge the poll, it is deemed to be disabled. When a failure is detected on server 306, then client 301 automatically establishes a connection via line 309 to backup server 307. Henceforth, all future transactions from client 301 are performed by backup server 307, rather than primary server 306. Server 307 continues servicing clients 302 and 304 in addition to newly added clients 301 and 303. It should be noted that additional servers may be incorporated as backups. For instance, if servers 306 and 307 were both to fail, client 301 can be automatically switched over to yet a third server. Similarly, robust client 302 has a primary connection 310 to server 307, while retaining connection information to server 306 as a backup, in case server 307 were to fail.

When a primary server becomes disabled, in-flight transactions currently pending on that server are handled as follows. From the server side, each server has a companion server, which it polls to determine whether the companion server is functioning properly. Companion servers may consist of paired servers polling each other (e.g., server 306 polling server 307 and vice versa) or a daisy-chained series of servers, whereby one server polls an adjacent server, etc., with the last server polling the first server. When a failure is detected, all in-flight transactions associated with the failed server are rolled back by the backup server according to the information contained within the cumulative redo log 311. A cumulative redo log 311 is required in addition to the redo logs 312 and 313 contained in servers 306 and 307 because should a server ever become disabled, its redo log also becomes disabled. From the client side, all in-flight transactions associated with a client are stored in that client's transaction log. When the client detects a server failure (e.g., through polling), that client automatically establishes a connection to its designated backup server. The client then resubmits all in-flight transactions contained within its transaction log to the backup server. Thereupon, the backup server can continue processing the in-flight transactions without any interruption from the user. Essentially, a server failure is handled transparent to the user and does not require that the user take any further action.

Figure 4:
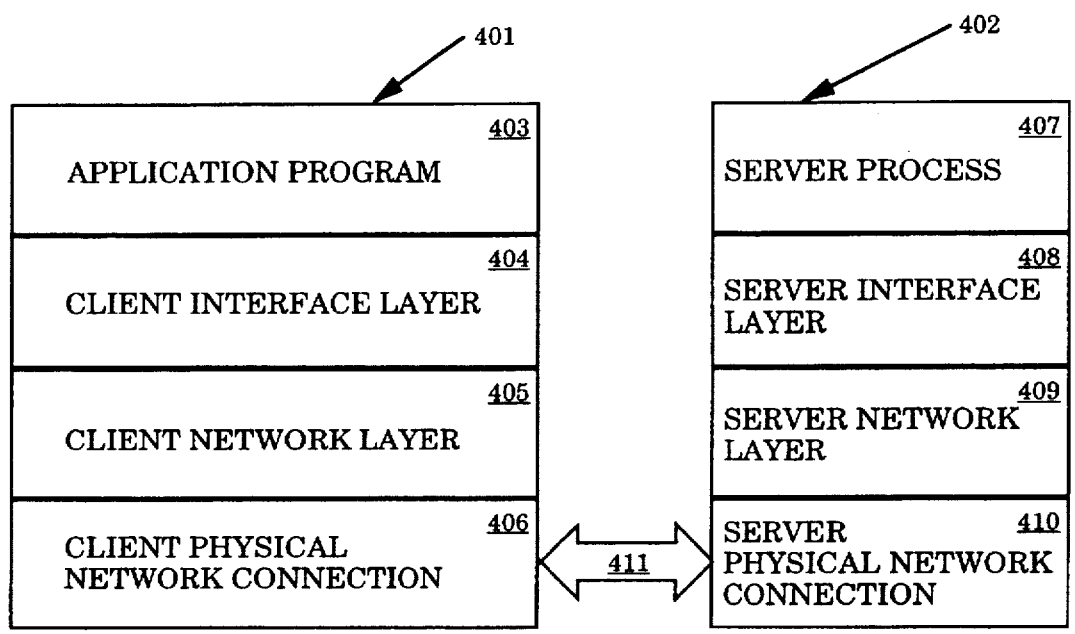
FIG. 4 shows the different layers associated with the client and server sides of a client/server system.

FIG. 4 shows the different layers associated with the client side 401 and with the server side 402. From the client side, the top-most layer 403 is the application program layer 403, which is used for handling such tasks as, payroll, inventory, human resources, etc. Beneath application layer 403 is a client interface layer 404. The application program interfaces either through a compiler or directly with client interface layer 404. It is this client interface layer 404 which enables a client application to request DBMS services. It also performs certain connections with a server, accesses tables managed by the DBMS, requests DBMS services, and supports fault tolerance functionalities. Furthermore, the connections are established through the client interface layer 404. The client interface layer 404 is coded such that normal transactions flow through a primary connection to the preferred server. The secondary connection to a backup server is established only in case of failure. A set of instructions residing in a client network layer 405 below the client interface layer 404, are used to establish the database connections.

SQL*Net or some other program implementing a communication protocol is required to be running on both the primary and backup servers. Database connections specify the following connection information: the communications protocol to use during the connection (e.g., TCP/IP), the host on which the database resides, and the name of the database on the host. The client interface is kept open during a failure so that in-flight transaction information may be resubmitted and processed by the backup server. The logging or storing of transaction information is performed by the client interface layer 404. Hence, the application program layer 403 remains undisturbed during a failure. Network layer (e.g., SQL NET) 405 is used for hiding the complexities associated with network operations. Lastly, there is the physical network connection layer 406 which actually performs the physical transfers of data between the client and the server from the client side 401.

The server side 402 also has its corresponding set of layers 407–410. The top-most layer 407 relates to server processes. There exists a server process for servicing each individual client. A server interface layer 408 resides beneath the server process layer 407. This server interface layer 408 performs complimentary functions (e.g., calls to subroutines) with respect to the client interface layer 404. The client interface layer 404 and server interface layer 408 act as a pipeline for conveying information between the client and the server. The last two layers, server network layer 409 and server physical network connection layer 410, perform equivalent functions for the server side 402, as layers 405 and 406 do for the client side 401. The database session is conducted over connection 411 between the two physical network layers 406 and 410.

Figure 5:
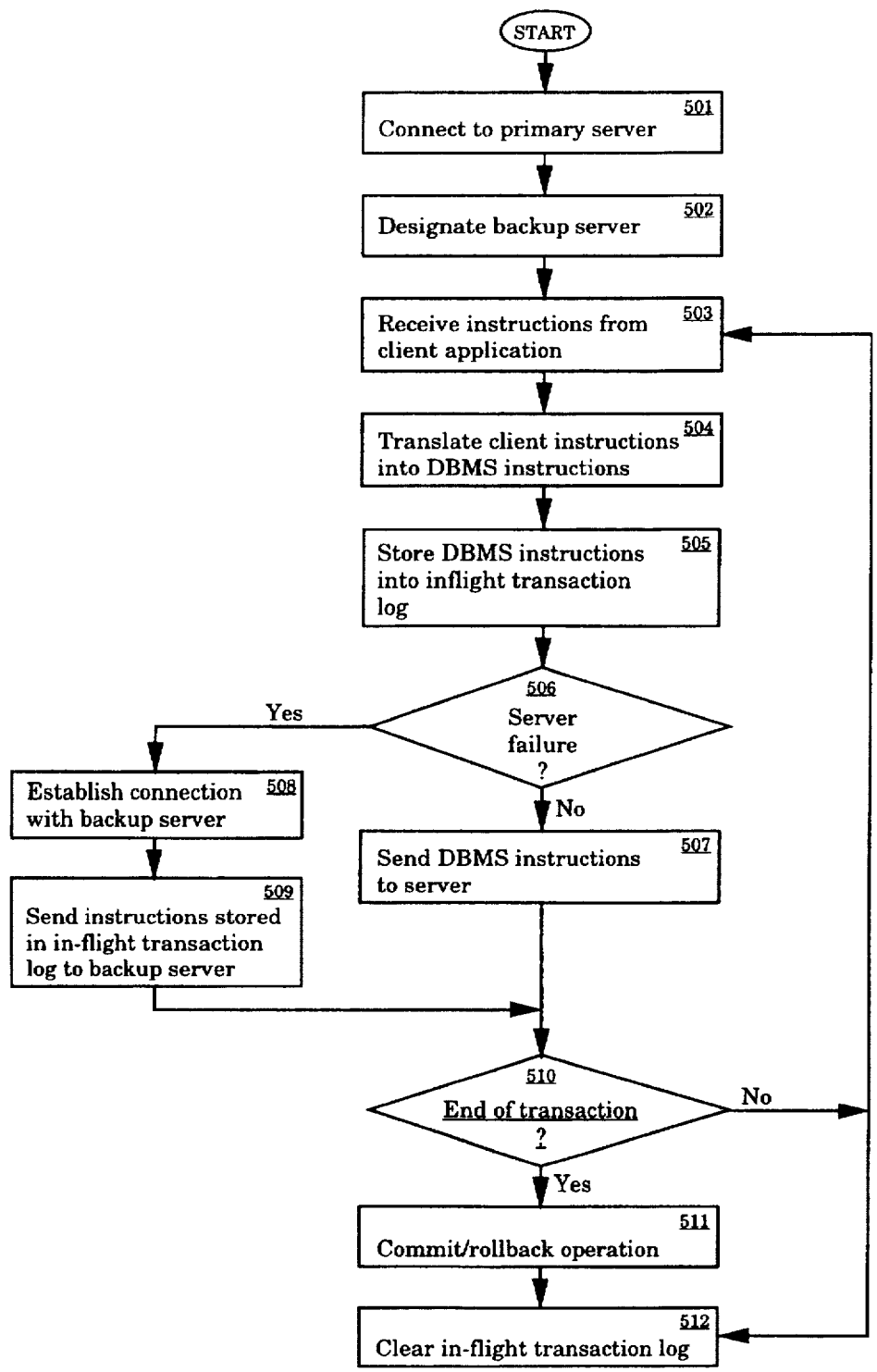
FIG. 5 is a flowchart describing the steps and functionalities performed by a client interface layer for supporting fault tolerance.

FIG. 5 is a flowchart describing the steps performed by the client interface layer. Initially, a connection is made from a client to a primary server, step 501. A backup server is also designated, step 502. The client application issues instructions in step 503. The instructions are then translated into DBMS instructions, step 504. These DBMS instructions are stored into the client's in-flight transaction log, step 505. A determination is made as to whether the primary server is still functioning properly, step 506. If so, the DBMS instructions are sent to the primary server for processing, step 507. Otherwise, if it is determined that the primary server is disabled, a connection is established from the client to the backup server, step 508. Thereupon, in-flight instructions stored within the client's transaction log are sent to the backup server for processing, step 509. In step 510, a determination is made as to whether the transaction has ended. If the transaction is still on-going, step 503 is repeated. Otherwise, at the end of the transaction, the transaction is either committed or rolled back, step 511. The in-flight transaction log can then be cleared, step 512. At this point, the user may disconnect or begin a new transaction at step 503.

Figure 6:
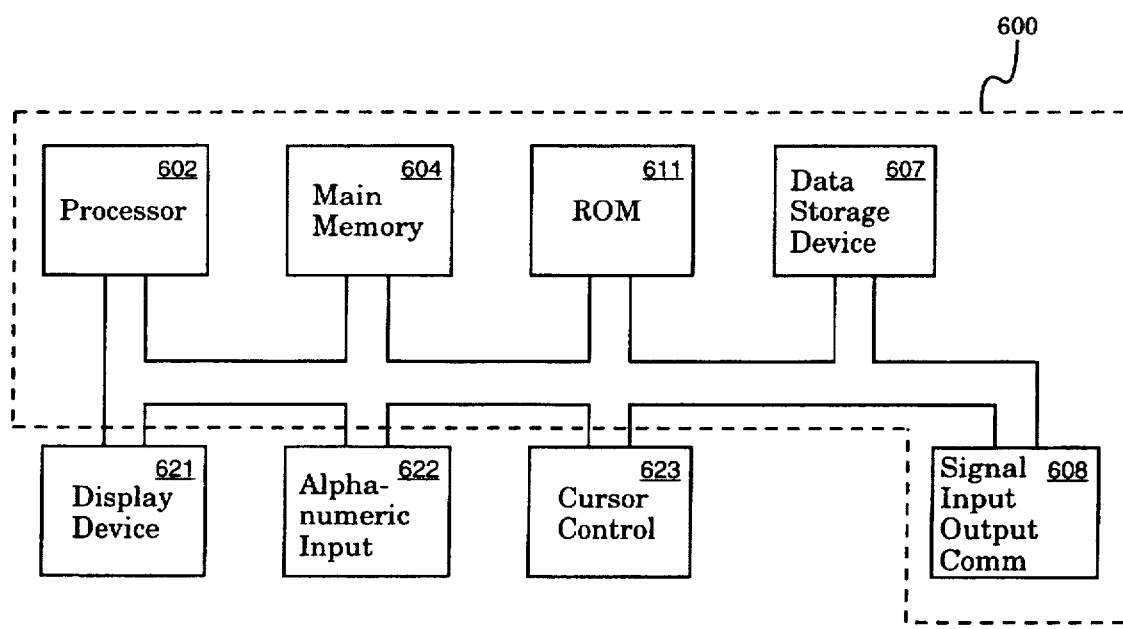
FIG. 6 illustrates an exemplary computer system upon which the present invention may be implemented or practiced.

FIG. 6 illustrates an exemplary computer system 600 upon which the present invention may be implemented or practiced. It is appreciated that the computer system 600 of FIG. 6 is exemplary only and that the present invention can operate within a number of different computer systems. Computer system 600 of FIG. 6 includes an address/data bus 601 for conveying digital information between the various components, a central processor unit (CPU) 602 for processing the digital information and instructions, a main memory 604 comprised of random access memory (RAM) for storing the digital information and instructions, a read only memory (ROM) 611 for storing information and instructions of a more permanent nature. In addition, computer system 600 may also include a data storage device 607 (e.g., a magnetic, optical, foppy,or tape drive) for storing vast amounts of data, and an I/O interface 608 for interfacing with peripheral devices (e.g., computer network, modem, etc.). It should be noted that the client program for performing fault tolerance can be stored either in main memory 604, data storage device 607, or in an external storage device. Devices which may be coupled to computer system 600 include a display device 621 for displaying information to a computer user, an alphanumeric input device 622 (e.g., a keyboard), and a cursor control device 623 (e.g., mouse, trackball, light pen, etc.) for inputting data and selections.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a client/server computer system, a method for providing fault tolerance, comprising the steps of:

establishing a connection from a client computer to a primary server computer;

designating a backup server computer for processing transactions from the client if the primary server becomes disabled, wherein the transactions are processed according to database management system (DBMS) instructions;

storing connection information for connecting the client to the backup server;

storing in-flight client transaction information by a log writing process for completing in-flight transactions without user intervention if the primary server becomes disabled;

determining whether the primary server is disabled, wherein if the primary server becomes disabled:

A) establishing a connection from the client to the backup server;

B) submitting the in-flight transaction information to the backup server;

C) completing the in-flight transactions on the backup server;

D) routing subsequent transactions from the client to the backup server for processing.

2. The method of claim 1, further comprising the step of the client periodically polling the primary server to determine whether the primary server is functioning properly, wherein the client submits the in-flight transaction information to the backup server if the primary server becomes disabled.

3. The method of claim 1, wherein the in-flight transaction information to be submitted to the backup server is stored in memory residing within the client.

4. The method of claim 3 further comprising the step of storing in-flight transaction information in memory residing within the primary server, wherein a user can selectively rollback an in-flight transaction according to the information stored within the properly functioning primary server.

5. The method of claim 4 further comprising the steps of:

storing in-flight transaction information within memory residing within a mass storage device coupled to the primary server and the backup server;

determining whether the primary server is properly functioning;

rolling back in-flight transactions pending on the primary server when the primary server becomes disabled, wherein the rollback is performed by the backup server according to the information stored in the memory residing in the mass storage device.

6. A fault tolerant computer system comprising:

a client computer for running an application;

a first server coupled to the client for accepting transactions generated by the client application, wherein the transactions are processed according to database management system (DBMS) instructions;

a first memory for storing connection information corresponding to a second server, wherein if the first server becomes disabled, a connection from the client to the second server is automatically established by the client and transactions from the client are handled by the second server;

a second memory for storing information pertaining to transactions pending on the first server, wherein the information is stored by a log writing process for completing the pending transactions without user intervention when the first server becomes disabled;

a client interface coupled to the second memory which submits pending transaction information to the second server for processing by the second server when the first server becomes disabled.

7. The computer system of claim 6, further comprising polling logic for determining whether the first server is functioning properly, wherein the client submits the transaction information stored in the second memory residing within the client when the first server becomes disabled.

8. The computer system of claim 6 further comprising:

a third memory residing within the first server for storing pending transaction information;

rollback logic coupled to the client, wherein a user can selectively rollback a transaction pending on the client according to the information stored within the third memory in the properly functioning first server.

9. The computer system of claim 8 further comprising a fourth memory residing within a mass storage device for storing information pertaining to a plurality of pending transactions on the first server and the second server, wherein when the first server becomes disabled, the backup server utilizes the rollback logic to roll back transactions pending on the first server according to the information stored in the fourth memory.

10. A computer-readable medium having stored thereon instructions for causing a client computer to implement fault tolerance comprising the steps of:

establishing a first connection between the client and a primary server for servicing transactions generated by an application running on the client, wherein the transactions are processed according to database management system (DBMS) instructions;

designating a second connection between the client and a backup server;

storing in-flight transaction information corresponding to transactions being processed by the primary server, wherein the information is stored by a log writing process for completing the in-flight transactions without user intervention if the primary server fails;

detecting whether the primary server has failed, wherein if the primary server fails:
  a) establishing the second connection to the backup server;
  b) submitting the in-flight transaction information to the backup server.
  c) completing the in-flight transaction by the backup server.

11. The computer-readable memory of claim 10, wherein the instructions further comprise the step of periodically polling the primary server to determine whether the primary server is functioning properly, wherein the client submits the in-flight transaction information to the backup server if the primary server becomes disabled.

12. The computer-readable memory of claim 10, wherein the in-flight transaction information to be submitted to the backup server is stored by the client.

13. The computer-readable memory of claim 10, wherein the in-flight transaction information is stored by the primary server, wherein a user can selectively rollback the in-flight transaction according to the information stored in the properly functioning primary server.

14. The computer-readable memory of claim 10, wherein the instructions further comprise the steps of:

storing in-flight transaction information within memory residing within a mass storage device coupled to the primary server and the backup server;

determining whether the primary server is properly functioning;

rolling back in-flight transactions pending on the primary server when the primary server becomes disabled, wherein the rollback is performed by the backup server according to the information stored in the memory residing in the mass storage device.

15. A computer capable of being coupled as a client to a server of a computer network for accessing a database stored in a mass storage device, comprising:

a bus;

a processor coupled to the bus for running an application on the client;

a first memory coupled to the bus for storing connection information for connecting the client to a primary server and for connecting the client to a backup server, wherein the client is normally connected to the primary server and the primary server handles transactions generated by an application running on the client, and the transactions are processed according to database management system (DBMS) instructions;

a second memory coupled to the bus for storing in-flight transaction information by a log writing process for completing in-flight transactions without user intervention if the primary server becomes disabled;

an interface coupled to the bus for determining whether the primary server is functioning properly, wherein if the primary server becomes disabled, the client automatically establishes a connection to the backup server and transmits the in-flight transaction information to the backup server so that the backup server can complete the in-flight transaction.

* * * * *